(12) United States Patent
Horikoshi et al.

(10) Patent No.: US 10,651,758 B2
(45) Date of Patent: May 12, 2020

(54) MOTOR DRIVE APPARATUS INCLUDING SHORT-CIRCUIT JUDGMENT UNIT FOR CAPACITOR OF DC LINK UNIT

(71) Applicant: FANUC CORPORATION, Yamanashi (JP)

(72) Inventors: Shinichi Horikoshi, Yamanashi (JP); Yuuya Nakagawa, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/262,914

(22) Filed: Jan. 31, 2019

(65) Prior Publication Data

US 2019/0260300 A1    Aug. 22, 2019

(30) Foreign Application Priority Data

Feb. 20, 2018 (JP) ................. 2018-027952

(51) Int. Cl.
| | |
|---|---|
| *H02M 5/458* | (2006.01) |
| *H02M 7/48* | (2007.01) |
| *H02P 29/024* | (2016.01) |
| *H02P 3/18* | (2006.01) |
| *H02P 23/06* | (2016.01) |

(Continued)

(52) U.S. Cl.
CPC ........... *H02M 5/4585* (2013.01); *H02M 1/32* (2013.01); *H02M 7/06* (2013.01); *H02M 7/48* (2013.01); *H02P 3/18* (2013.01); *H02P 23/06* (2013.01); *H02P 29/024* (2013.01)

(58) Field of Classification Search
CPC ........ H02M 5/40; H02M 5/45; H02M 5/4505; H02M 5/458; H02M 5/4585; H02M 7/06; H02M 7/48; H02P 23/06
USPC ........... 363/34, 37, 40, 41, 48, 56.01, 56.07, 363/56.08, 56.1, 56.11
See application file for complete search history.

(56) References Cited

U.S. PATENT DOCUMENTS

| | | | | |
|---|---|---|---|---|
| 5,793,623 A | * | 8/1998 | Kawashima | ........ H02M 1/4225 363/36 |
| 2005/0151658 A1 | * | 7/2005 | Kono | .................... B60L 3/0023 340/647 |

(Continued)

FOREIGN PATENT DOCUMENTS

| | | |
|---|---|---|
| JP | H06098530 A | 4/1994 |
| JP | H09229986 A | 9/1997 |

(Continued)

*Primary Examiner* — Yemane Mehari
(74) *Attorney, Agent, or Firm* — Hauptman Ham, LLP (57) ABSTRACT

A motor drive apparatus includes a PWM converter configured to convert AC power of an AC power supply into DC power, a DC link unit including capacitors provided on the DC output side of the PWM converter and connected in series with each other, an inverter configured to convert the DC power of the DC link unit into AC power for driving a motor and output the AC power, a DC link voltage detection unit, a power supply voltage detection unit, a short-circuit judgment unit configured to judge that at least one of the capacitors has shorted when the DC link voltage value is smaller than the peak value of the power supply voltage, and a shut-off unit configured to shut off flow of AC power from the AC power supply into the PWM converter when the short-circuit judgment unit judges that at least one of the capacitors has shorted.

2 Claims, 4 Drawing Sheets

(51) Int. Cl.
*H02M 7/06* (2006.01)
*H02M 1/32* (2007.01)

(56) References Cited

U.S. PATENT DOCUMENTS

| | | | |
|---|---|---|---|
| 2006/0158197 A1* | 7/2006 | Horikoshi | G01R 31/343 |
| | | | 324/551 |
| 2012/0068636 A1* | 3/2012 | Iwashita | H02M 5/4585 |
| | | | 318/376 |
| 2016/0226427 A1* | 8/2016 | Sakai | H02P 27/08 |
| 2019/0068106 A1* | 2/2019 | Kuroki | H02P 29/025 |

FOREIGN PATENT DOCUMENTS

| | | |
|---|---|---|
| JP | H11118860 A | 4/1999 |
| JP | 2005533476 A | 11/2005 |
| JP | 2006217675 A | 8/2006 |
| JP | 2007-295686 A | 11/2007 |
| JP | 4021431 B2 | 12/2007 |
| JP | 2011067037 A | 3/2011 |
| JP | 2014-131446 A | 7/2014 |
| JP | 5689497 B2 | 3/2015 |

* cited by examiner

FIG. 3B

MOTOR DRIVE APPARATUS INCLUDING SHORT-CIRCUIT JUDGMENT UNIT FOR CAPACITOR OF DC LINK UNIT

RELATED APPLICATIONS

The present application claims priority of Japanese Application Number 2018-027952, filed on Feb. 20, 2018, the disclosure of which is hereby incorporated by reference herein in its entirety.

BACKGROUND OF THE INVENTION

1. Field of the Invention

The present invention relates to a motor drive apparatus including a short-circuit judgment unit for a capacitor of a DC link unit.

2. Description of the Related Art

In a motor drive apparatus which drives motors in a machine tool, forging machinery, an injection molding machine, industrial machinery, or various robots, AC power supplied from an AC power supply is converted into DC power and output to a DC link unit by a PWM converter, the DC power in the DC link unit is further converted into AC power by an inverter, and the AC power is supplied to the motor provided for each drive axis as drive power.

The DC link unit includes a capacitor having the function of suppressing pulsation of the DC output of the PWM converter and the function of storing DC power. Such a capacitor is also called a DC link capacitor or a smoothing capacitor. Since a capacitor is generally resistant to voltage, capacitors are often connected in series with each other to withstand a high DC voltage in the DC link unit. Examples of the capacitor provided in the DC link unit may include an electrolytic capacitor.

As disclosed in, e.g., Japanese Patent No. 4021431, a converter apparatus which is connected to an inverter circuit for driving a motor, via a DC link including a storage unit capable of charging regenerative power for the motor, converts AC power supplied from a power supply into DC power, and supplies the DC power to the inverter circuit via the DC link is known to include a voltage detection unit which detects a DC link voltage of the DC link, a voltage holding unit which holds the DC link voltage detected at start of charging the regenerative power in the storage unit, and a charging stop unit which stops charging in the storage unit when the currently detected DC link voltage is higher than an upper limit voltage obtained by adding a predetermined potential difference to the DC link voltage held in the voltage holding unit.

As disclosed in, e.g., Japanese Patent No. 5689497, a motor drive apparatus is known to include a converter unit which converts an AC voltage input from a main power supply into a DC voltage, a DC link unit which rectifies the DC voltage output from the converter unit, an inverter unit which converts the DC voltage rectified by the DC link unit into an AC voltage for driving a motor by a semiconductor switching element, a voltage application unit which is provided independently of the main power supply and applies a voltage to the DC link unit, a voltage detection unit which detects the voltage of the DC link unit after the voltage is applied by the voltage application unit, and an abnormality judgment unit which judges whether an abnormality has occurred in the DC link unit, based on a value, measured for a predetermined time, of the voltage detected by the voltage detection unit, and a rate of temporal change in the voltage.

As disclosed in, e.g., Japanese Unexamined Patent Publication No. 2014-131446, a power conversion device is known to include a converter circuit (2) which rectifies a voltage from an AC power supply (7), an inverter circuit (6) which is connected in parallel with an output of the converter circuit (2), converts power from the converter circuit (2) into AC power having a predetermined voltage and frequency by a switching operation of switching elements (Su, Sv, Sw, Sx, Sy, Sz), and outputs the AC power to a motor (8), an inverter circuit control unit (13) which controls the switching operation of the switching elements (Su, Sv, Sw, Sx, Sy, Sz), a DC link unit (3) which includes a first capacitor (3a) connected in parallel with an input of the inverter circuit (6) and used to smooth pulsation of a voltage generated upon the switching operation of the switching elements (Su, Sv, Sw, Sx, Sy, Sz) and connects the converter circuit (2) to the inverter circuit (6), a series circuit (5) which includes a second capacitor (4c) and a switch (5a) connected in series with each other and is connected in parallel with the first capacitor (3a), and a switch control circuit (14) which controls opening and closing of the switch (5a) to suppress an excess voltage of the DC link unit (3).

As disclosed in, e.g., Japanese Unexamined Patent Publication No. 2007-295686, a direct AC power conversion device is known to include a converter unit (1) which converts a three-phase AC input voltage into a DC voltage, an inverter unit (2) which converts the DC voltage converted by the converter unit (1) into a predetermined three-phase AC output voltage, a positive first DC link unit (L1) and a negative second DC link unit (L2) which connect the converter unit (1) to the inverter unit (2), and a clamp circuit (3, 13, 23) connected between the first DC link unit (L1) and the second DC link unit (L2) and including at least two capacitance elements (C1, C2, C3), wherein the clamp circuit (3, 13, 23) performs charging in the capacitance elements (C1, C2, C3) by a regenerative current from the inverter unit (2) with each of the capacitance elements (C1, C2, C3) serially connected between the first DC link unit (L1) and the second DC link unit (L2), while the clamp circuit (3, 13, 23) performs discharging from the capacitance elements (C1, C2, C3) with each of the capacitance elements (C1, C2, C3) parallelly connected between the first DC link unit (L1) and the second DC link unit (L2).

SUMMARY OF INVENTION

When short-circuit failure occurs in one of series-connected capacitors provided in a DC link unit between a PWM converter and an inverter in a motor drive apparatus, a voltage higher than previously is applied to normal capacitors having no short-circuit failure. When an excess voltage equal to or greater than the voltage resistance is continuously applied to the normal capacitors (i.e., capacitors having no short-circuit failure at first) for a long time, they may break or fire. Especially in an electrolytic capacitor, when an excess voltage is continuously applied for a long time, the electrolytic solution may spout out and, in the worst case, fire. As a result, a motor, a motor drive apparatus which drives the motor, or a machine or a system equipped with the motor driven by the motor drive apparatus, for example, may suffer any type of failure such as breakage or deformation. To solve this problem, it is very important to early detect short-circuit failure of the capacitors provided in the DC link unit. For example, short-circuit failure may be detected by constantly monitoring the voltage applied to each of the series-connected capacitors. However, providing a voltage monitoring circuit for each individual capacitor undesirably leads to an increase in number of parts, addition of a circuit, and eventually, a rise in cost. Therefore, a demand has arisen for a technique capable of ensuring safety by early detecting short-circuit failure of series-connected capacitors provided in a DC link unit between a PWM converter and an inverter in a motor drive apparatus, without an additional circuit.

According to one aspect of the present disclosure, a motor drive apparatus includes a PWM converter configured to convert AC power input from an AC power supply into DC power by PWM control and outputs the DC power, a DC link unit including a plurality of capacitors connected in parallel with a DC output of the PWM converter and connected in series with each other, an inverter connected in parallel with the DC link unit, and configured to convert the DC power in the DC link unit into AC power for driving a motor and output the AC power, a short-circuit judgment unit configured to compare a DC link voltage value as a value of a voltage applied to a positive and negative terminal of the DC link unit with a peak value of a power supply voltage applied to an AC input of the PWM converter and judge that at least one of the plurality of capacitors in the DC link unit has shorted when, as a result of comparison, the DC link voltage value is smaller than the peak value of the power supply voltage, and a shut-off unit configured to shut off flow of the AC power from the AC power supply into the PWM converter when the short-circuit judgment unit judges that at least one of the plurality of capacitors has shorted.

BRIEF DESCRIPTION OF THE DRAWINGS

The present invention will be more clearly understood with reference to the following accompanying drawings.

DETAILED DESCRIPTION

A motor drive apparatus including a short-circuit judgment unit for a capacitor of a DC link unit will be described below with reference to the drawings. These drawings use different scales as appropriate to facilitate an understanding. The mode illustrated in each drawing is one example for carrying out the present invention, and the present invention is not limited to the embodiments illustrated in these drawings.

Figure 1:
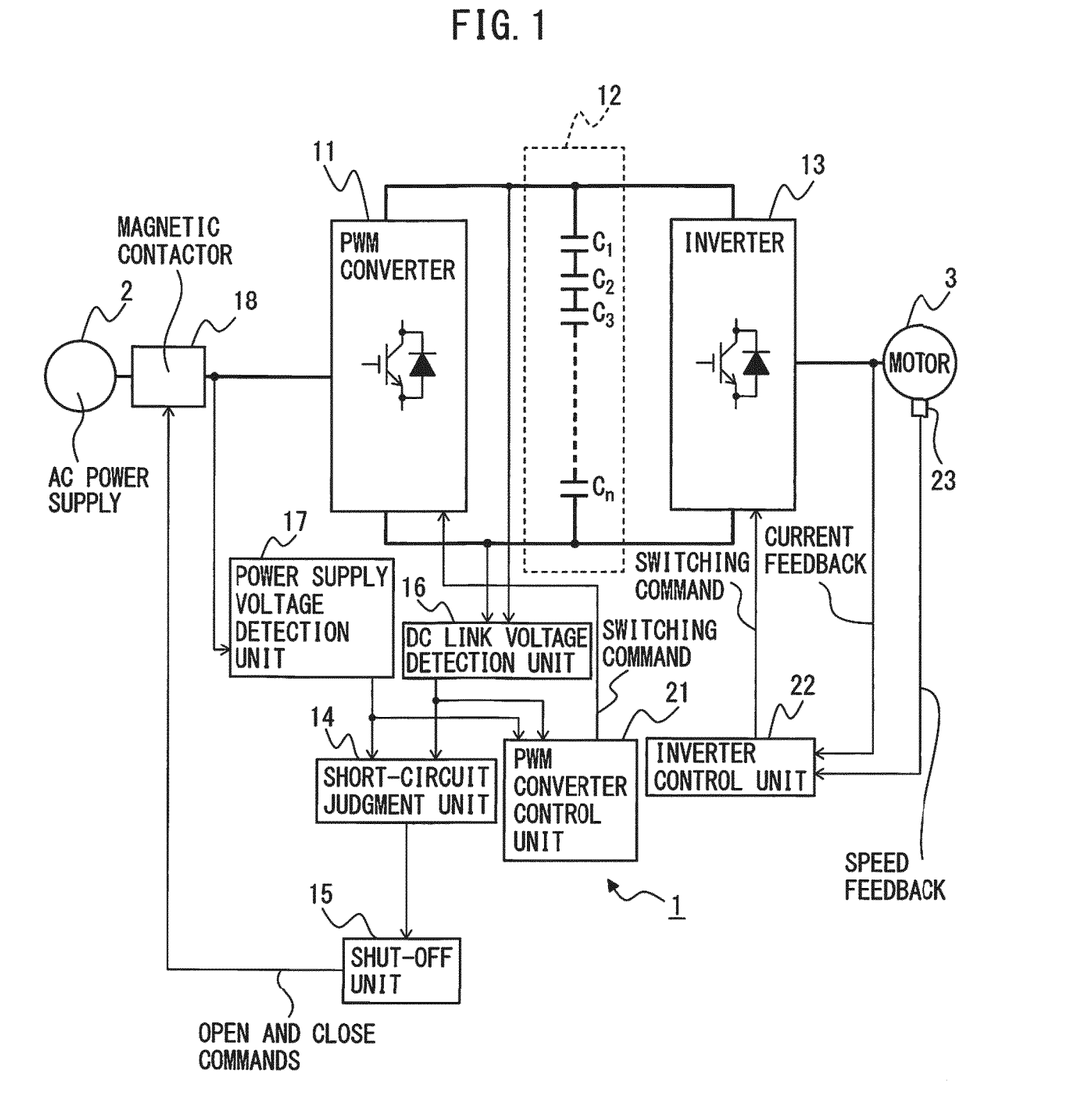
FIG. 1 is a diagram illustrating a motor drive apparatus according to an embodiment of the present disclosure.
Figure 2:
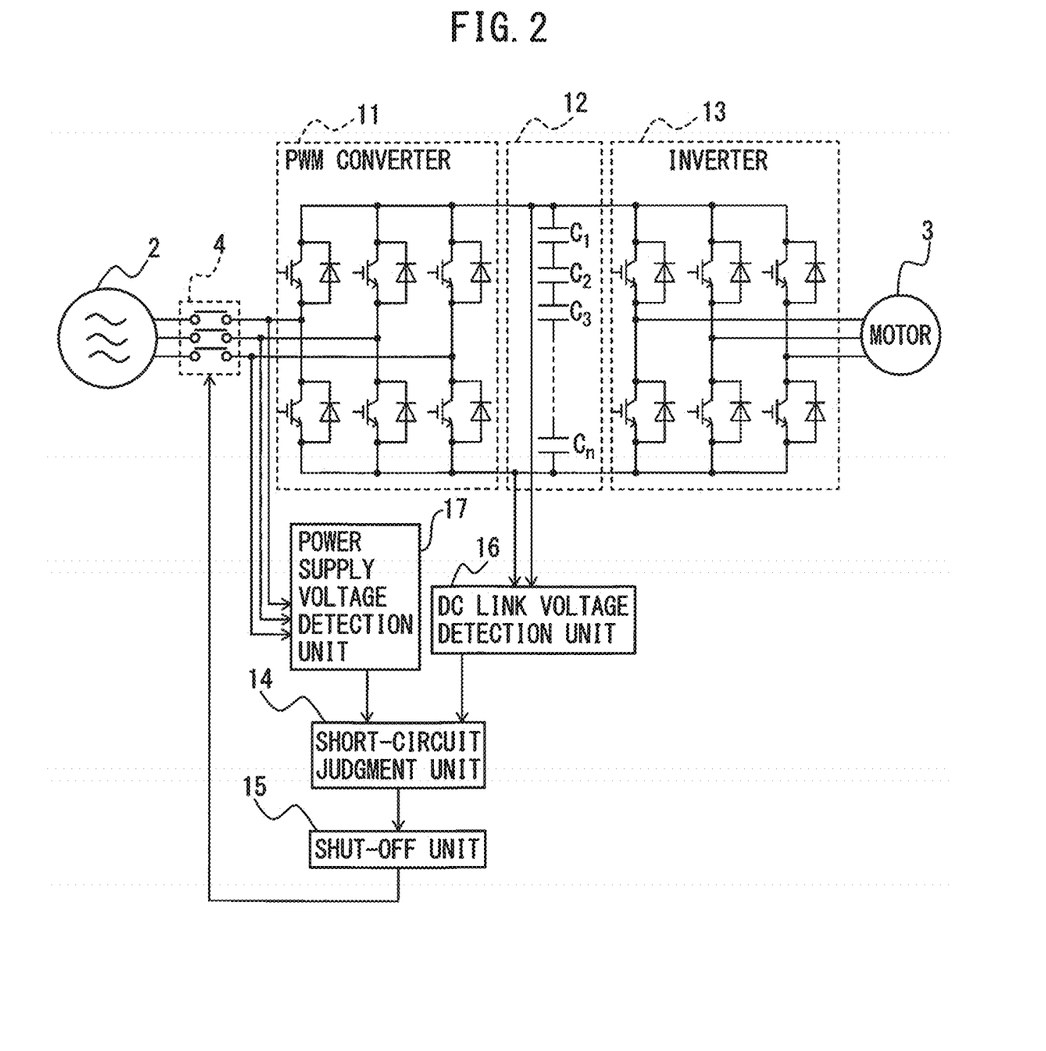
FIG. 2 is a circuit diagram illustrating an example of a DC link unit and a three-phase PWM converter and inverter in the motor drive apparatus.

FIG. 1 is a diagram illustrating a motor drive apparatus according to an embodiment of the present disclosure. FIG. 2 is a circuit diagram illustrating an example of a DC link unit and a three-phase PWM converter and inverter in the motor drive apparatus. FIG. 2 does not illustrate a PWM converter control unit 21 and an inverter control unit 22 illustrated in FIG. 1.

The case where one AC motor of the single-winding type (to be simply referred to as a "motor" hereinafter) 3 is controlled by a motor drive apparatus 1 connected to an AC power supply 2 will be taken as an example below. The number of motors 3 does not particularly limit this embodiment and may be other than one, and the motor 3 may be of the multiple-winding type. An inverter 13 is provided for each winding of the motor 3. The inverter 13 is, for example, provided for each motor 3 when a plurality of motors 3 of the single-winding type are used, provided for each winding when one motor 3 of the multiple-winding type is used, or provided for each winding of each motor 3 when a plurality of motors 3 of the multiple-winding type are used. The numbers of phases of the AC power supply 2 and the motor 3 do not particularly limit this embodiment, and a three- or single-phase configuration, for example, may be used. The type of motor 3 does not particularly limit this embodiment, either, and an induction or synchronous motor, for example, may be used. Machines equipped with the motors 3 include, e.g., a machine tool, a robot, forging machinery, an injection molding machine, industrial machinery, various electrical appliances, an electric train, an automobile, and an aircraft.

The motor drive apparatus 1 controls driving of the motor 3 by controlling an inverter 13 which converts power between the DC power of a DC link unit 12 and the AC power serving as drive power or regenerative power for the motor 3, like general motor drive apparatuses. A inverter control unit 22 in the motor drive apparatus 1 generates a switching command for controlling the speed, the torque, or the rotor position of the motor 3, based on, e.g., the (rotor) rotation speed of the motor 3 detected by a speed detector 23 (speed feedback), a current flowing through the winding of the motor 3 (current feedback), a predetermined torque command, and an operation program for the motor 3. A power conversion operation by the inverter 13 is controlled based on the switching command generated by the inverter control unit 22.

The motor drive apparatus 1 includes a PWM converter 11, a DC link unit 12, an inverter 13, a short-circuit judgment unit 14, a shut-off unit 15, a DC link voltage detection unit 16, and a power supply voltage detection unit 17, as illustrated in FIG. 1. The motor drive apparatus 1 further includes a PWM converter control unit 21 for controlling the power conversion operation of the PWM converter 11, and an inverter control unit 22 for controlling the power conversion operation of the inverter 13. In the example illustrated in FIGS. 1 and 2, the motor drive apparatus 1 further includes a magnetic contactor 18, but an opening and closing device such as a relay or a power semiconductor switching element may be substituted for the magnetic contactor 18 as long as flow of AC power from the AC power supply 2 into the PWM converter 11 can be shut off when a close command is received by the shut-off unit 15, as will be described later.

The PWM converter 11 serves as a PWM switching control rectifier circuit which converts AC power input from the AC power supply 2 into DC power by PWM control and outputs the DC power to the DC side. The PWM converter 11 is implemented in a bridge circuit of switching elements and diodes connected in antiparallel with the switching elements and converts power between the AC power in the AC power supply 2 and the DC power in the DC link unit 12, by performing ON/OFF control of each switching element in accordance with the switching command based on PWM control received from the PWM converter control unit 21. In other words, the PWM converter 11 can convert AC power input from the AC power supply 2 into DC power and output the DC power to the DC side, and can convert the DC power in the DC link unit 12 into AC power and return the AC power to the AC power supply 2. Examples of the switching element may include an IGBT, a thyristor, a GTO (Gate Turn-OFF thyristor), and a transistor, but the type of switching element itself does not limit this embodiment, and other types of switching elements may be used. The PWM converter 11 serves as a three-phase bridge circuit when the AC power supply 2 has a three-phase configuration, and as a single-phase bridge circuit when the AC power supply 2 has a single-phase configuration. FIG. 2 illustrates a bridge circuit of a three-phase PWM converter 11 connected to a three-phase AC power supply 2 as an example. An AC reactor and an AC line filter, for example, are provided on the AC input side of the PWM converter 11, although they are not illustrated in FIG. 2.

The DC link unit 12 is connected in parallel with the DC output of the PWM converter 11 and the DC input of the inverter 13. The DC link unit 12 includes capacitors $C_1$ to $C_n$ (n is an integer of 2 or more) connected in series with each other. The capacitors $C_1$ to $C_n$ in the DC link unit 12 have the function of suppressing pulsation of the DC output of the PWM converter 11 and the function of storing DC power. Examples of the capacitors $C_1$ to $C_n$ may include electrolytic capacitors and film capacitors. FIGS. 1 and 2 illustrate an example in which only one set of series-connected capacitors $C_1$ to $C_n$ is used, but a plurality of sets of series-connected capacitors $C_1$ to $C_n$ may be provided and connected in parallel with each other to constitute the DC link unit 12.

The inverter 13 is connected in parallel with the DC link unit 12, converts the DC power in the DC link unit 12 into AC power for driving the motor 3, and outputs the AC power. The inverter 13 is implemented in a bridge circuit of switching elements and diodes connected in antiparallel with the switching elements. The inverter 13 serves as a three-phase bridge circuit when the motor 3 has a three-phase configuration, and as a single-phase bridge circuit when the motor 3 has a single-phase configuration. FIG. 2 illustrates a bridge circuit of a three-phase inverter 13 connected to a three-phase motor 3 as an example. The inverter 13 converts power between the DC power in the DC link unit 12 and the AC power serving as drive power or regenerative power for the motor 3, by ON/OFF control of each switching element based on the switching command received from the inverter control unit 22. More specifically, the inverter 13 performs the switching operation of the internal switching elements, based on the switching command received from the inverter control unit 22, to convert DC power supplied from the PWM converter 11 via the DC link unit 12 into AC power having a desired voltage (current) magnitude and a desired frequency for driving the motor 3 and output the AC power (inversion operation). The motor 3 thus operates based on the supplied variable-voltage, variable-frequency AC power. Regenerative power occurs during deceleration of the motor 3, but the switching operation of the internal switching elements is performed based on the switching command received from the inverter control unit 22, to convert the AC regenerative power occurring in the motor 3 into DC power and return the DC power to the DC link unit 12 (rectification operation). Examples of the switching element may include an IGBT, a thyristor, a GTO, and a transistor, but the type of switching element itself does not limit this embodiment, and other types of switching elements may be used.

The DC link voltage detection unit 16 detects a DC link voltage value as the value of a voltage applied to a positive and negative terminal of the DC link unit 12. The voltage applied to the positive and negative terminal of the DC link unit 12 is the potential difference between the positive terminal of the capacitor $C_1$ and the negative terminal of the capacitor $C_n$. The voltage applied to the positive and negative terminal of the DC link unit 12 will be simply referred to as the "DC link voltage" hereinafter. When, for example, two capacitors $C_1$ and $C_2$ are provided in the DC link unit 12, the potential difference between the positive terminal of the capacitor $C_1$ and the negative terminal of the capacitor $C_2$ is defined as the DC link voltage.

The power supply voltage detection unit 17 detects the peak value of a voltage (phase voltage) applied to the AC input of the PWM converter 11 by the AC power supply 2. The peak value of a voltage applied to the AC input of the PWM converter 11 by the AC power supply 2 will be simply referred to as the "peak value of the power supply voltage" hereinafter.

The magnetic contactor 18 is used to open and close the electric path between the AC power supply 2 and the PWM converter 11. The magnetic contactor 18 performs a closing operation for electrically connecting the AC power supply 2 and the PWM converter 11 to each other and an opening operation for electrically disconnecting them from each other, under the control of the shut-off unit 15. In other words, a closing operation for electrically connecting the AC power supply 2 and the PWM converter 11 to each other is implemented by closing the contact point of the magnetic contactor 18, and an opening operation for electrically disconnecting the AC power supply 2 and the PWM converter 11 from each other is implemented by opening the contact point of the magnetic contactor 18. As long as flow of AC power from the AC power supply 2 into the PWM converter 11 can be shut off when a close command is received by the shut-off unit 15, a relay or a power semiconductor switching element, for example, may be substituted for the magnetic contactor 18.

The PWM converter control unit 21 controls the power conversion operation of the PWM converter 11. Generally, the PWM converter 11 is, in principle, capable of a power conversion operation based on PWM control only when the DC link voltage value is larger than the peak value of the power supply voltage. Hence, the PWM converter control unit 21 generates a switching command for controlling the DC link voltage to be higher than the peak value of the power supply voltage, based on the DC link voltage value detected by the DC link voltage detection unit 16 and the peak value of the power supply voltage detected by the power supply voltage detection unit 17. For example, the value of the voltage output from the PWM converter 11 can be controlled by appropriately changing the "boosting ratio" defined as the ratio of the value of the voltage output from the PWM converter 11 to the peak value of the power supply voltage input from the AC power supply 2 (i.e., (Value of DC Voltage Output from PWM Converter 11)/(Peak Value of Power Supply Voltage Input from AC Power Supply 2)×100 [%]). The switching command generated by the PWM converter control unit 21 is transmitted to any switching element in the PWM converter 11. The PWM converter 11 converts AC power in the AC power supply 2 into DC power and outputs the DC power to the DC link unit 12, and converts DC power in the DC link unit 12 into AC power and returns the AC power to the AC power supply 2, by ON/OFF control of each switching element in accordance with the switching command received from the PWM converter control unit 21.

The inverter control unit 22 generates a switching command for controlling the speed, the torque, or the rotor position of the motor 3, based on, e.g., the rotation speed of the motor 3 detected by the speed detector 23, a current flowing through the winding of the motor 3, a predetermined torque command, and an operation program for the motor 3. The switching command generated by the inverter control unit 22 is transmitted to any switching element in the inverter 13. The inverter 13 converts DC power in the DC link unit 12 into AC power for driving the motor 3 and outputs the AC power, by ON/OFF control of each switching element in accordance with the switching command received from the inverter control unit 22. The motor 3 is driven based on the AC power output from the inverter 13.

The short-circuit judgment unit 14 compares the DC link voltage value with the peak value of the power supply voltage and judges that at least one of the capacitors $C_1$ to $C_n$ in the DC link unit 12 has shorted when it detects that, as a result of comparison, the DC link voltage value is smaller than the peak value of the power supply voltage. When all of the capacitors $C_1$ to $C_n$ in the DC link unit 12 are normal, the PWM converter 11 is controlled to make the DC link voltage value (i.e., the voltage value on the DC output side of the PWM converter 11) larger than the peak value of the power supply voltage (i.e., the voltage peak value on the AC input side of the PWM converter 11) by the PWM converter control unit 21. When at least one of the capacitors $C_1$ to $C_n$ in the DC link unit 12 shorts, the DC link voltage gets lower than the peak value of the power supply voltage. Under the circumstances, in this embodiment, it is determined whether the DC link voltage value is smaller than the peak value of the power supply voltage on the AC input side of the PWM converter 11, and it is judged that at least one of the capacitors $C_1$ to $C_n$ has shorted when the DC link voltage value is smaller than the peak value of the power supply voltage. Short-circuit judgment processing of the short-circuit judgment unit 14 will be described in detail later.

The shut-off unit 15 shuts off flow of AC power from the AC power supply 2 into the PWM converter 11 when the short-circuit judgment unit 14 judges that at least one of the capacitors $C_1$ to $C_n$ has shorted. As illustrated in FIG. 1, assuming, for example, a magnetic contactor 18 provided to open and close the electric path between the AC power supply 2 and the PWM converter 11, when the short-circuit judgment unit 14 judges that at least one of the capacitors $C_1$ to $C_n$ has shorted, the shut-off unit 15 ensures safety by stopping driving of the motor 3 by outputting a shut-off command (open command) to the magnetic contactor 18, opening the contact point of the magnetic contactor 18, and shutting off power supply from the AC power supply 2 to the PWM converter 11. A shut-off operation by the shut-off unit 15 is preferably performed as soon as possible after the short-circuit judgment unit 14 judges that at least one of the capacitors $C_1$ to $C_n$ has shorted. Even when an opening and closing device such as a relay or a power semiconductor switching element is substituted for the magnetic contactor 18, the shut-off unit 15 causes the opening and closing device to perform an operation for outputting a shut-off command (open command) and shutting off power supply from the AC power supply 2 to the PWM converter 11 when it is judged that at least one of the capacitors $C_1$ to $C_n$ has shorted. Shut-off processing of the shut-off unit 15 will be described in detail later.

In this manner, in this embodiment, when it is judged that at least one of the capacitors $C_1$ to $C_n$ has shorted, the power conversion operation of the PWM converter 11 is not simply stopped, but power supply from the AC power supply 2 to the PWM converter 11 is physically shut off for the following reason. Since the PWM converter 11 is implemented in a bridge circuit of switching elements and diodes connected in antiparallel with the switching elements, even when the switching elements are opened, a current flows via the diodes, and power flow from the AC power supply 2 into the DC link unit 12 via the PWM converter 11 may not be completely shut off. As a result, simply stopping the power conversion operation of the PWM converter 11 may result in breakage upon continuous application of a high voltage to normal capacitors having no short-circuit failure. Under the circumstances, in this embodiment, when it is judged that at least one of the capacitors $C_1$ to $C_n$ has shorted, power flow from the AC power supply 2 into the DC link unit 12 via the PWM converter 11 is reliably cut off by physically shutting off power supply from the AC power supply 2 to the PWM converter 11 (performing the opening operation of the magnetic contactor 18 in the example illustrated in FIGS. 1 and 2). Thus, since no current flows into the normal capacitors having no short-circuit failure and no voltage is applied to them, no breakage occurs.

Short-circuit judgment processing of the short-circuit judgment unit 14 and shut-off processing of the shut-off unit 15 will be described in more detail below with reference to FIGS. 3A and 3B.

Figure 3A:
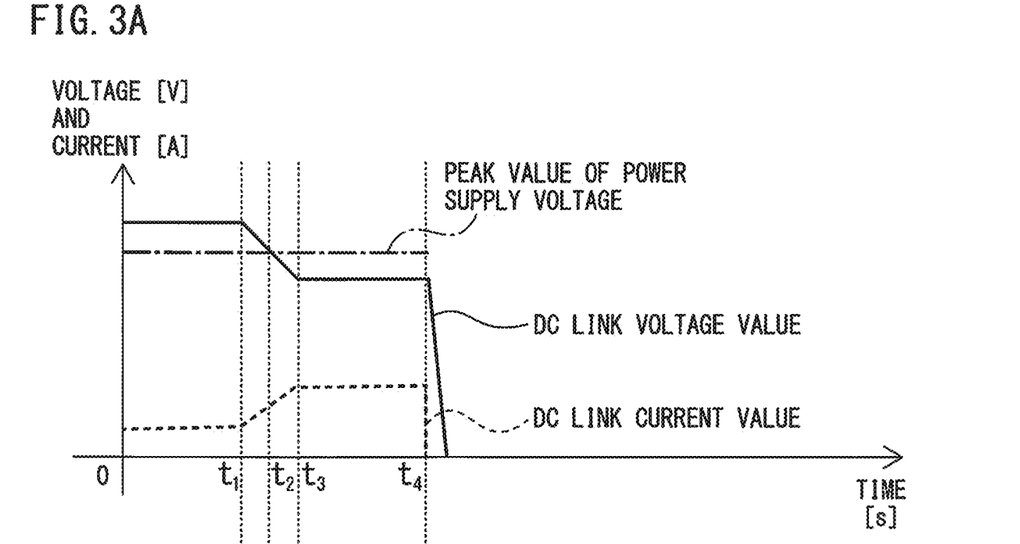
FIG. 3A is a graph exemplifying the peak value of the power supply voltage, the DC link voltage value, and the DC link current value when one of capacitors in the DC link unit has failed, and represents an exemplary waveform of each unit in the motor drive apparatus according to this embodiment.
Figure 3B:
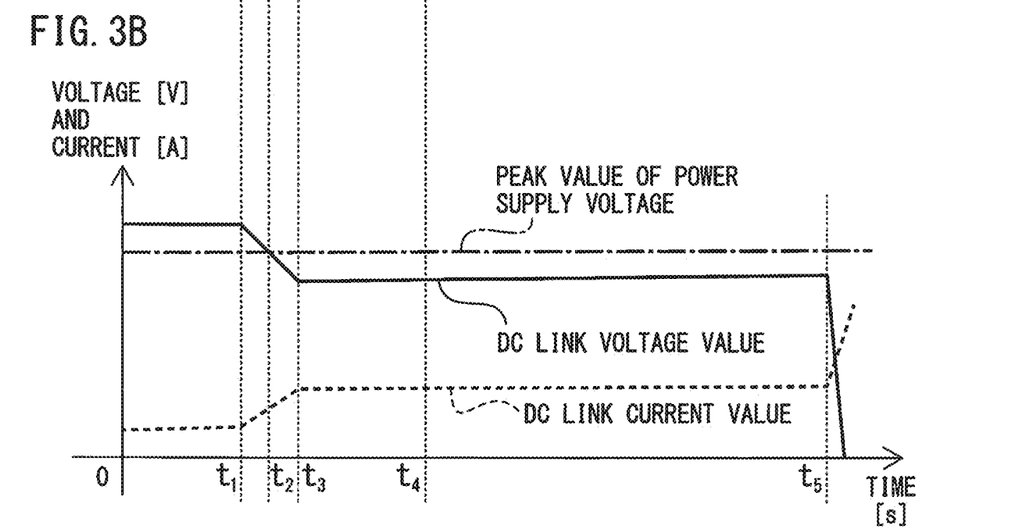
FIG. 3B is a graph exemplifying the peak value of the power supply voltage, the DC link voltage value, and the DC link current value when one of capacitors in a DC link unit has failed, and represents an exemplary waveform of each unit in the conventional motor drive apparatus.

FIG. 3A is a graph exemplifying the peak value of the power supply voltage, the DC link voltage value, and the DC link current value when one of capacitors in the DC link unit has failed, and represents an exemplary waveform of each unit in the motor drive apparatus according to this embodiment. FIG. 3B is a graph exemplifying the peak value of the power supply voltage, the DC link voltage value, and the DC link current value when one of capacitors in a DC link unit has failed, and represents an exemplary waveform of each unit in the conventional motor drive apparatus. Referring to FIGS. 3A and 3B, an alternate long and short dashed line indicates an exemplary peak value of the power supply voltage, a solid line indicates an exemplary DC link voltage value, and a broken line indicates an exemplary DC link current value. Each waveform illustrated in FIGS. 3A and 3B is merely one example, and it may vary slightly, depending on how a motor drive system is operated.

The waveform of each unit in the motor drive apparatus 1 according to this embodiment will be described first with reference to FIG. 3A.

The case where, when the motor 3 is driven by controlling the power conversion operation of the inverter 13 using the inverter control unit 22 in the normal state in which none of the capacitors $C_1$ to $C_n$ in the DC link unit 12 have short-circuit failure, short-circuit failure occurs in one of the capacitors $C_1$ to $C_n$ at time $t_1$ will be considered as an example herein. As illustrated in FIG. 3A, until time $t_1$, the PWM converter 11 is controlled to make the DC link voltage value larger than the peak value of the power supply voltage by the PWM converter control unit 21. At time $t_1$, short-circuit failure occurs in one of the capacitors $C_1$ to $C_n$. From time $t_2$ onward, the DC link voltage value is smaller than the peak value of the power supply voltage. In this case, since a voltage higher than that before time $t_1$ is applied to each capacitor having no short-circuit failure, the DC link current value output from the PWM converter 11 to the DC link unit 12 rises. From time $t_2$ onward, the short-circuit judgment unit 14 detects that the DC link voltage value is smaller than the peak value of the power supply voltage, and judges that at least one of the capacitors $C_1$ to $C_n$ in the DC link unit 12 has shorted. At time $t_4$, the shut-off unit 15 shuts off flow of AC power from the AC power supply 2 into the PWM converter 11. A shut-off operation by the shut-off unit 15 is preferably performed as soon as possible after the short-circuit judgment unit 14 judges that at least one of the capacitors $C_1$ to $C_n$ has shorted, i.e., the period from time $t_2$ to time $t_4$ is preferably as short as possible. As illustrated in FIG. 1, assuming, for example, a magnetic contactor 18 provided to open and close the electric path between the AC power supply 2 and the PWM converter 11, the shut-off unit 15 outputs a shut-off command (open command) to the magnetic contactor 18, opens the contact point of the magnetic contactor 18, and shuts off power supply from the AC power supply 2 to the PWM converter 11. Thus, since no DC link current flows into the normal capacitors having no short-circuit failure and no high voltage is applied to them, another short-circuit failure does not occur in the normal capacitors having no short-circuit failure. When, for example, two capacitors $C_1$ and $C_2$ are provided in the DC link unit 12 and have a voltage resistance of 450 [V] and a DC link voltage of 800 [V], the pair of capacitors $C_1$ and $C_2$ can withstand up to 900 [V] assuming that both of the capacitors $C_1$ and $C_2$ are normal. In this case, if short-circuit failure occurs in the capacitor $C_1$, an excess voltage of 800 [V] is applied to the normal capacitor $C_2$. According to this embodiment, when short-circuit failure occurs in the capacitor $C_1$, since the shut-off unit 15 shuts off flow of AC power from the AC power supply 2 into the PWM converter 11, the situation in which an excess voltage is applied to the normal capacitor $C_2$ for a long time can be avoided.

The waveform of each unit in the conventional motor drive apparatus will be described with reference to FIG. 3B as follows. The case where, when a motor is driven by controlling the power conversion operation of an inverter in the normal state in which none of capacitors in a DC link unit have short-circuit failure, short-circuit failure occurs in one of the capacitors at time $t_1$ will be considered as an example herein. As illustrated in FIG. 3B, until time $t_1$, a PWM converter is controlled to make the DC link voltage value larger than the peak value of the power supply voltage. At time $t_1$, short-circuit failure occurs in one of the capacitors. From time $t_2$ onward, the DC link voltage value is smaller than the peak value of the power supply voltage. In this case, since a voltage higher than that before time $t_1$ is continuously applied to each capacitor having no short-circuit failure, the DC link current value output from the PWM converter to the DC link unit rises. Upon continuous application of an excess voltage equal to or greater than the voltage resistance to the normal capacitors (i.e., capacitors having no short-circuit failure at first) for a long time, even capacitors having no short-circuit failure at time $t_5$ break or fire and short, and eventually, all capacitors having no short-circuit failure similarly short so that the DC link voltage becomes zero and a high current flows. In, e.g., an electrolytic capacitor, when an excess voltage is continuously applied for a long time, the electrolytic solution may spout out and, in the worst case, fire.

Figure 4:
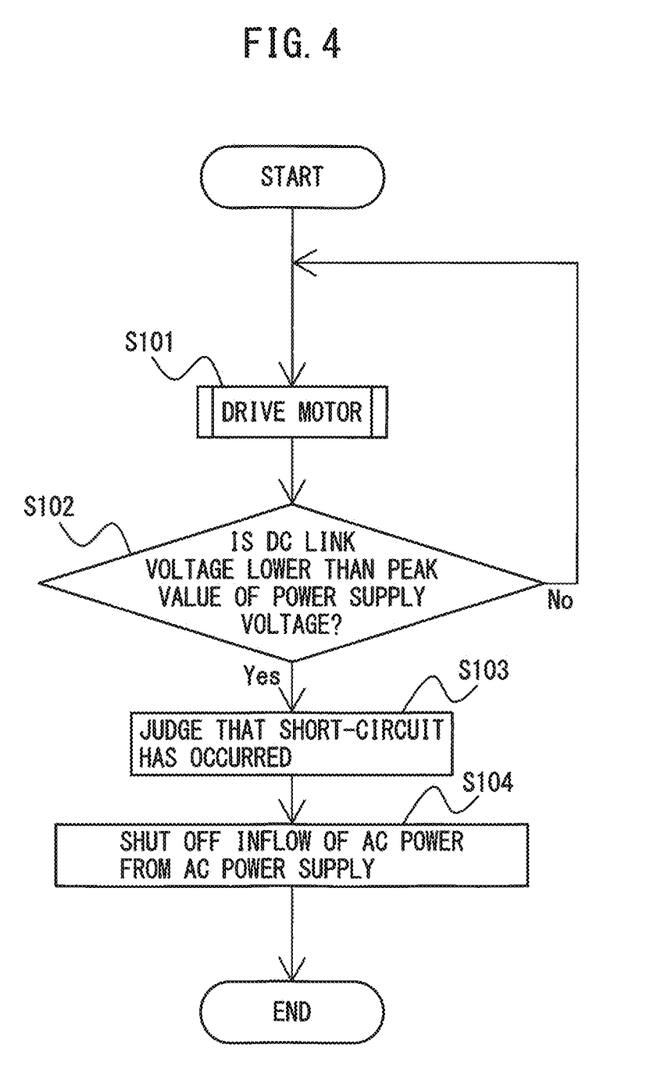
FIG. 4 is a flowchart illustrating the operation sequence of the motor drive apparatus according to this embodiment.

FIG. 4 is a flowchart illustrating the operation sequence of the motor drive apparatus according to this embodiment.

In the motor drive apparatus 1 according to this embodiment, when the motor 3 is driven by controlling the power conversion operation of the inverter 13 using the inverter control unit 22 (step S101), the short-circuit judgment unit 14 compares the DC link voltage value with the peak value of the power supply voltage in step S102. When the short-circuit judgment unit 14 detects in step S102 that the DC link voltage value is smaller than the peak value of the power supply voltage, the process advances to step S103; otherwise, the process returns to step S101.

In step S103, the short-circuit judgment unit 14 judges that at least one of the capacitors $C_1$ to $C_n$ in the DC link unit 12 has shorted.

In step S104, the shut-off unit 15 shuts off flow of AC power from the AC power supply 2 into the PWM converter 11. As illustrated in FIG. 1, assuming, for example, a magnetic contactor 18 provided to open and close the electric path between the AC power supply 2 and the PWM converter 11, when it is judged that at least one of the capacitors $C_1$ to $C_n$ has shorted, the shut-off unit 15 ensures safety by stopping driving of the motor 3 by outputting a shut-off command (open command) to the magnetic contactor 18, opening the contact point of the magnetic contactor 18, and shutting off power supply from the AC power supply 2 to the PWM converter 11.

The above-mentioned short-circuit judgment unit 14, shut-off unit 15, PWM converter control unit 21, and inverter control unit 22 may be constructed in, e.g., software program form, or may be constructed as a combination of various electronic circuits and a software program. In this case, the function of each unit can be implemented by causing an arithmetic processing unit such as an ASIC or a DSP to operate the software program. The short-circuit judgment unit 14 and the shut-off unit 15 may be provided in the PWM converter control unit 21, or the function of each unit may be implemented by causing an arithmetic processing unit such as an ASIC or a DSP located outside the inverter control unit 22 to execute the above-described software program, or may be implemented as a semiconductor integrated circuit in which a software program for implementing the functions of the short-circuit judgment unit 14 and the shut-off unit 15 is written.

The DC link voltage detection unit 16 that detects the DC link voltage used in short-circuit judgment processing by the short-circuit judgment unit 14 and the power supply voltage detection unit 17 that detects the peak value of the power supply voltage used in this processing can employ, e.g., a voltage detector generally provided to detect the value of a DC link voltage used in voltage control of the capacitors $C_1$ to $C_n$ of the DC link unit 12, and no additional circuit may be separately provided so that short-circuit failure of the capacitors can be detected at low cost.

According to one aspect of the present disclosure, a motor drive apparatus which ensures safety by early detecting short-circuit failure of series-connected capacitors provided in a DC link unit between a PWM converter and an inverter without an additional circuit can be achieved.

The invention claimed is:
1. A motor drive apparatus comprising:
   a PWM converter configured to convert AC power input from an AC power supply into DC power by PWM control and outputs the DC power;
   a DC link unit comprising a plurality of capacitors connected in parallel with a DC output of the PWM converter and connected in series with each other;
   an inverter connected in parallel with the DC link unit, and configured to convert the DC power in the DC link unit into AC power for driving a motor and output the AC power;
   a DC link voltage detection unit configured to detect a DC link voltage value as a value of a voltage applied to a positive and negative terminal of the DC link unit;

a power supply voltage detection unit configured to detect a peak value of a power supply voltage applied to an AC input of the PWM converter;

a short-circuit judgment unit configured to compare the DC link voltage value with the peak value of the power supply voltage and judge that at least one of the plurality of capacitors in the DC link unit has shorted when, as a result of comparison, the DC link voltage value is smaller than the peak value of the power supply voltage; and a shut-off unit configured to shut off flow of the AC power from the AC power supply into the PWM converter when the short-circuit judgment unit judges that at least one of the plurality of capacitors has shorted.

2. The motor drive apparatus according to claim 1, wherein each of the plurality of capacitors comprises an electrolytic capacitor.

\* \* \* \* \*